United States Patent
Liang et al.

(10) Patent No.: US 9,985,484 B2
(45) Date of Patent: May 29, 2018

(54) SURFACE GROOVE PATTERNS FOR PERMANENT MAGNET MACHINE ROTORS

(71) Applicant: Ford Global Technologies, LLC, Dearborn, MI (US)

(72) Inventors: Feng Liang, Troy, MI (US); Lusu Guo, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 14/734,580

(22) Filed: Jun. 9, 2015

(65) Prior Publication Data

US 2016/0365762 A1   Dec. 15, 2016

(51) Int. Cl.
*H02K 1/27* (2006.01)
*H02K 29/03* (2006.01)

(52) U.S. Cl.
CPC ......... *H02K 1/2706* (2013.01); *H02K 1/2766* (2013.01); *H02K 29/03* (2013.01); *H02K 2201/06* (2013.01)

(58) Field of Classification Search
CPC .... H02K 1/276; H02K 1/2766; H02K 1/2773; H02K 1/22; H02K 1/27; H02K 1/2706; H02K 21/025; H02K 21/12; H02K 21/14; H02K 21/16; H02K 2201/03
USPC ....................... 310/156.53, 156.56
See application file for complete search history.

(56) References Cited

U.S. PATENT DOCUMENTS

| 6,218,753 | B1* | 4/2001 | Asano | H02K 1/276 |
| | | | | 310/156.53 |
| 2002/0047432 | A1* | 4/2002 | Miyashita | H02K 1/276 |
| | | | | 310/156.48 |
| 2004/0017123 | A1 | 1/2004 | Miyashita et al. | |
| 2005/0121990 | A1* | 6/2005 | Kaneko | H02K 29/03 |
| | | | | 310/156.47 |
| 2008/0224558 | A1* | 9/2008 | Ionel | H02K 1/2766 |
| | | | | 310/156.57 |
| 2011/0031843 | A1* | 2/2011 | Liang | H02K 1/2766 |
| | | | | 310/216.096 |
| 2011/0163624 | A1* | 7/2011 | Hori | H02K 1/276 |
| | | | | 310/156.53 |
| 2011/0254474 | A1* | 10/2011 | Saito | H02K 7/006 |
| | | | | 318/139 |

(Continued)

FOREIGN PATENT DOCUMENTS

| CN | 103956874 A | 7/2014 | | |
| EP | 1450462 A1 * | 8/2004 | ............. | H02K 1/146 |

OTHER PUBLICATIONS

Shigeyuki Yoshihara, et al., Development of Technology for Electronically Driven Powertrains in Hybrid Electric Vehicles, Hitachi Review, vol. 58, No. 7, 2009.

*Primary Examiner* — Jeremy Luks
(74) *Attorney, Agent, or Firm* — David Kelly; Brooks Kushman P.C.

(57) ABSTRACT

A permanent magnet electric machine includes a rotor configured to rotate about an axis. The rotor is comprised of axially stacked sections. Each section is comprised of axially stacked laminations that define a pattern of axial grooves on an outer surface of the rotor to reduce torque ripple. The pattern is different for at least two of the sections. The pattern for each section may alternate with respect to poles of the rotor.

3 Claims, 7 Drawing Sheets

(56) References Cited

U.S. PATENT DOCUMENTS

| | | | |
|---|---|---|---|
| 2013/0285500 A1* | 10/2013 | Kinashi | H02K 1/276 310/156.53 |
| 2014/0035420 A1 | 2/2014 | Li et al. | |
| 2015/0194849 A1* | 7/2015 | Kayano | H02K 1/276 310/156.53 |
| 2015/0270749 A1* | 9/2015 | Mochida | H02K 1/276 310/156.21 |
| 2016/0020653 A1* | 1/2016 | Ueda | H02K 1/276 310/43 |

* cited by examiner

SURFACE GROOVE PATTERNS FOR PERMANENT MAGNET MACHINE ROTORS

TECHNICAL FIELD

This application generally relates to surface groove patterns for permanent magnet machine rotors.

BACKGROUND

Hybrid-electric and electric vehicles utilize one or more electric machines to provide propulsion for the vehicle. A variety of electric machine technologies are available for such applications. Permanent magnet machines are a typical choice for vehicle applications. The permanent magnet machine includes a stator and a rotor. The rotor is constructed with permanent magnets. Coils in the stator are energized to create an electromagnetic flux that interacts with electromagnetic flux created by the permanent magnets of the rotor. The interaction of the fluxes causes the rotor to rotate. Due to various motor design characteristics, the interacting electromagnetic fluxes create a torque that is comprised of harmonic components. The torque may be described as a summation of components having different frequencies. This is observed as a ripple or oscillation in the torque. The torque ripple or torque oscillation causes vibration and noise.

SUMMARY

A permanent magnet machine includes a rotor configured to rotate about an axis and comprising a plurality of sections arranged along the axis, each of the sections comprising a plurality of axially stacked laminations that define a pattern of axial grooves on a circumferential surface of each of the sections such that the pattern is different for at least two of the sections.

For at least one of the sections, the pattern may repeat on the circumferential surface at an arc length corresponding to one pole of the rotor. For at least one of the sections, the pattern may repeat on the circumferential surface at an arc length corresponding to two poles of the rotor. For at least one of the sections, the pattern may repeat on the circumferential surface at an arc length corresponding to three poles of the rotor. The sections may be offset at a predetermined angle from adjacent sections such that pole locations defined by each section are offset from corresponding pole locations of adjacent sections. For each of the sections, a subset of the axial grooves may be aligned such that the subset of the axial grooves extends across an axial length of the rotor. The subset may include at least one of the axial grooves within each arc length corresponding to poles of the rotor. The pattern may alternate between adjacent sections. The rotor may further comprise a smooth section having no axial grooves.

A permanent magnet machine includes a rotor comprising a plurality of sections arranged along an axis of rotation, each of the sections comprising a plurality of axially stacked laminations that define a pattern of axial grooves on an outer surface of each of the sections such that, for an arc length of the outer surface corresponding to a pole of the rotor, the pattern is different for at least two of the sections.

The pole may be one of a plurality of poles of the rotor and, for at least one of the sections, the pattern may repeat for each of the poles. The pole may be one of a plurality of poles of the rotor and, for at least one of the sections, the pattern may alternate between poles that are adjacent. For each of the sections, a subset of axial grooves may be aligned such that the subset of axial grooves extends across an axial length of the rotor. The pole may be one of a plurality of poles of the rotor, and the poles of each of the sections may be offset by a predetermined angle from the poles of adjacent sections.

A permanent magnet machine includes a rotor comprising a plurality of poles arranged about an axis, each of the poles corresponding to a predetermined arc length of a circumferential surface of the rotor formed by a plurality of axially stacked laminations that define a pattern of axial grooves on the circumferential surface of the rotor such that, for each of the poles, the pattern is different for at least two of the poles.

The pattern of axial grooves for each of the poles may include at least one axial groove. The pattern may be different for each of the poles. The rotor may further comprise one pole without axial grooves. The pattern of axial grooves for each of the poles may include two axial grooves. The pattern of axial grooves for each of the poles may be defined by an angle between the axial grooves of each of the poles and the angle may be different for each of the poles.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
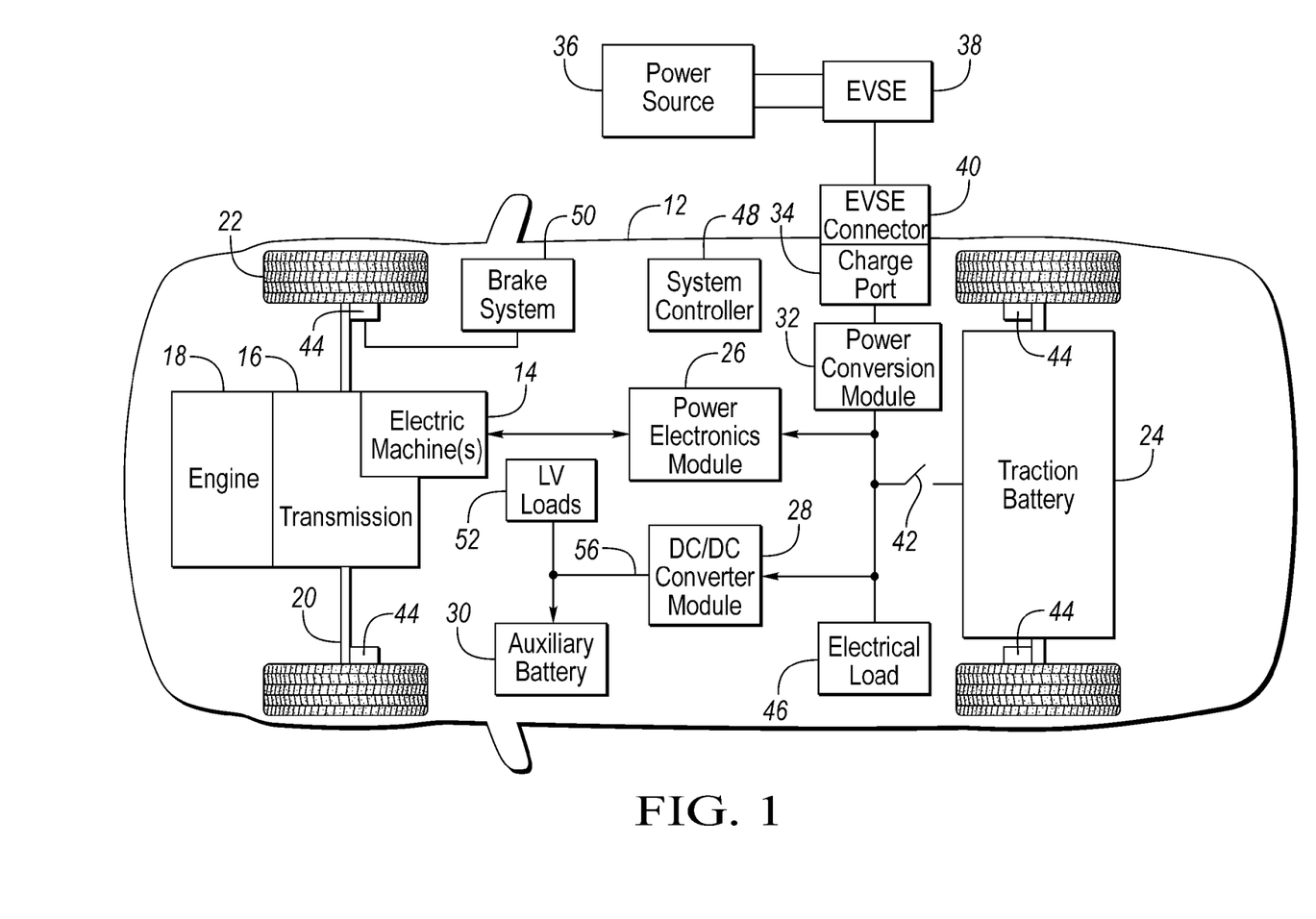
FIG. 1 is a diagram of a hybrid vehicle illustrating typical drivetrain and energy storage components including an electric machine.

FIG. 1 depicts a typical plug-in hybrid-electric vehicle (PHEV). A PHEV 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high-voltage direct current (DC) output. One or more contactors 42 may isolate the traction battery 24 from a high-voltage bus when opened and couple the traction battery 24 to the high-voltage bus when closed. The traction battery 24 is electrically coupled to one or more power electronics modules 26 via the high-voltage bus. The power electronics module 26 is also electrically coupled to the electric machines 14 and provides the ability to bi-directionally transfer energy between high-voltage bus and the electric machines 14. For example, a traction battery 24 may provide a DC voltage while the electric machines 14 may operate with a three-phase alternating current (AC) to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A vehicle 12 may include a DC/DC converter module 28 that is electrically coupled to the high-voltage bus. The DC/DC converter module 28 may be electrically coupled to a low-voltage bus 56. The DC/DC converter module 28 may convert the high voltage DC output of the traction battery 24 to a low voltage DC supply that is compatible with low-voltage vehicle loads 52. The low-voltage bus 56 may be electrically coupled to an auxiliary battery 30 (e.g., 12V battery). The low-voltage systems 52 may be electrically coupled to the low-voltage bus 56.

The vehicle 12 may be an electric vehicle or a plug-in hybrid vehicle in which the traction battery 24 may be recharged by an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled or connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands via a brake pedal and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. The high-voltage loads 46 may include compressors and electric heaters.

Electronic modules in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 12. A vehicle system controller (VSC) 48 may be present to coordinate the operation of the various components.

Figure 2A:
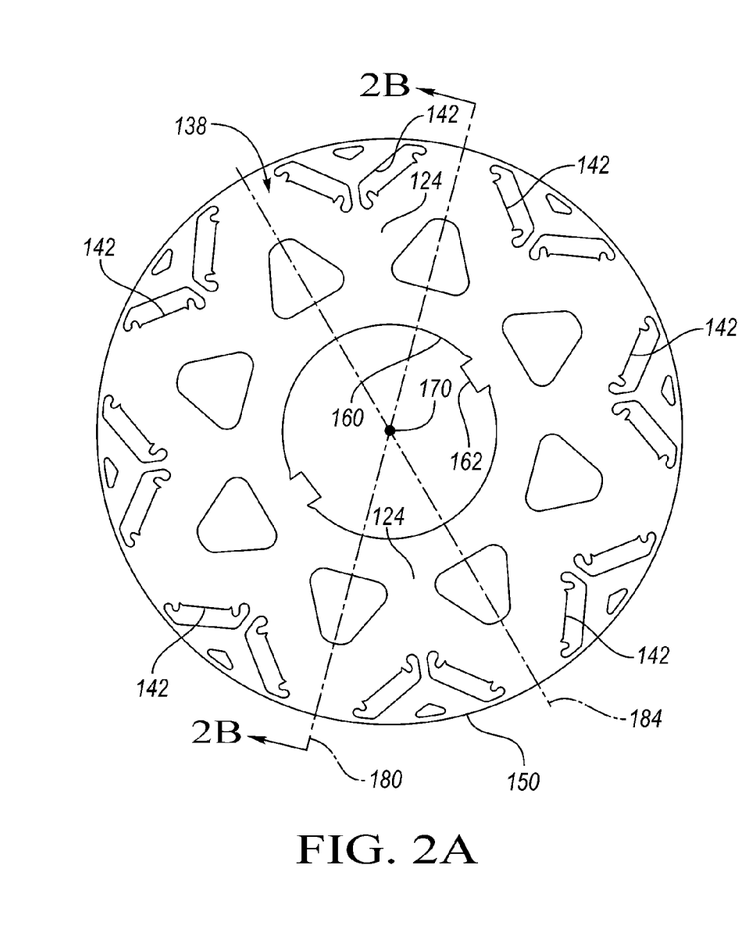
FIG. 2A is an example of a top view of a rotor lamination.
Figure 2B:
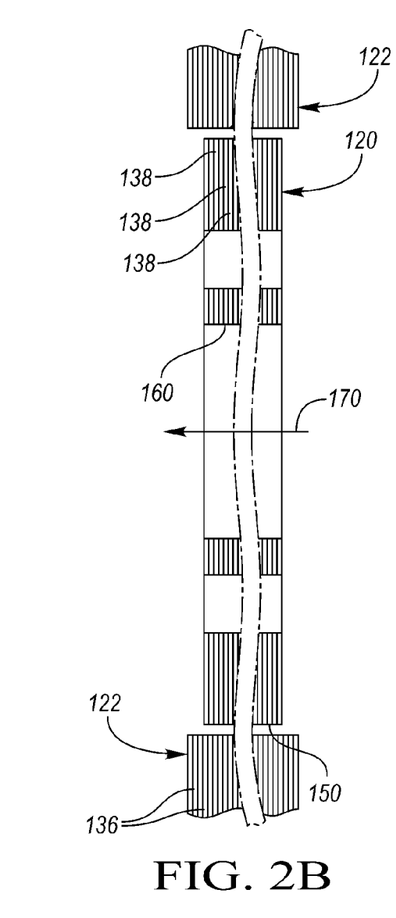
FIG. 2B is an example of a side view of a rotor constructed of a series of rotor laminations.

The electric machines 14 may be Interior Permanent Magnet (IPM) machines that include a stator 122 and a rotor 120. FIG. 2A depicts an example rotor lamination 138 and FIG. 2B depicts a side view of a stator 122 and rotor 120 configuration having multiple rotor laminations 138 and multiple stator laminations 136 arranged in an axially stacked relationship. The rotor laminations 138 may define a circular central opening 160 for accommodating a drive shaft with a keyway that may receive a drive key 162. The rotor laminations 138 may define a plurality of magnet openings 142 that are symmetrically disposed with respect to adjacent pairs of magnet openings 142.

A plurality of rotor sectors 124 corresponding to poles of the rotor may be defined by a plurality of inter-polar axes (e.g., 180, 184) emanating from a central axis 170 of rotation to an outer surface 150 of the rotor lamination 138. Each of the sectors 124 may include a pair of magnet openings 142. The inter-polar axes (e.g., 180, 184) may be positioned to be midway between adjacent magnet openings 142. Note that FIG. 2A only shows two of the possible inter-polar axes 180, 184 and does not show all possible inter-polar axes. FIG. 2B depicts a series of axially stacked rotor laminations 138 that are stacked along the central axis 170 about which the rotor 120 is configured to rotate.

Figure 3:
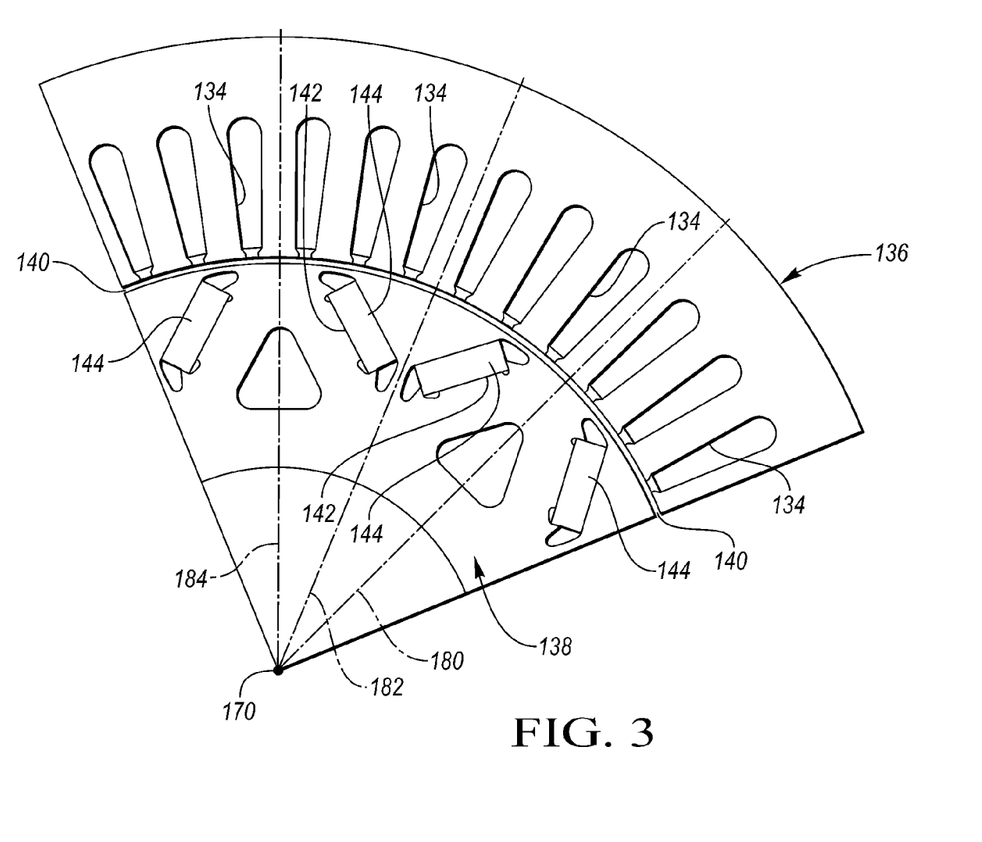
FIG. 3 is an example of a partial rotor and stator lamination.

FIG. 3 depicts a partial radial cross-sectional view of a possible construction of the rotor 120 and the stator 122. A partial stator lamination 136 and a partial rotor lamination 138 are depicted in FIG. 3. The rotor laminations 138 and the stator laminations 136 may be comprised of a ferrous alloy. A small air gap 140 is located between the inner periphery of the stator laminations 136 and the outer periphery 150 of the rotor laminations 138. The stator laminations 136 may define radially extending openings 134.

The rotor laminations 138 may define symmetrically positioned magnet openings 142 near the outer periphery 150 of each rotor lamination 138. Each magnet opening 142 may be configured to receive a magnet 144. Any number of laminations in a given design may be used, depending on design choice. The rotor laminations 138 and the stator laminations 136 may be arranged in a stack along the axis 170 of rotation. The axially stacked rotor laminations 138 and the magnets 144 may define a plurality of magnetic poles distributed about the axis 170.

The stator 136 may have conductors disposed in the radially extending openings 134 to form windings. The stator 122 may be comprised of an iron core made of a stack of stator laminations 136 and a winding arrangement for conductors that carry an excitation current. Current flowing through the stator winding generates a stator electromagnetic flux. The stator flux may be controlled by adjusting the magnitude and frequency of the current flowing through the stator windings. Because the stator windings are contained in openings 134 rather than a uniform sinusoidal distribution along the inner circumference of the stator, there may be harmonic fluxes in the stator flux.

The rotor 120 may be comprised of an iron core made of a stack of rotor laminations 138 and sets of permanent magnets 144 inserted within holes or cavities 142 that are defined by the iron core. The permanent magnets 144 in the rotor 120 may generate a rotor electromagnetic flux. The rotor flux may include harmonic fluxes due to shapes and sizes of the discrete permanent magnets. The stator flux and the rotor flux may be distributed in the air-gap 140. Interaction between the stator flux and the rotor flux causes the rotor 120 to rotate about the axis 170.

Poles of the rotor 120 may be geometrically defined to correspond to the sectors 124 defined by the rotor laminations 138. Each of the poles may be represented by a sector 124. A pole location may be generally defined by a center-pole axis 182 that extends radially from the axis 170 toward the outer surface 150 of the rotor 138 along a midpoint between adjacent magnet openings 142. The inter-polar axes (e.g, 180, 184) may extend radially from the axis 170 toward the outer surface 150 of the rotor 138 between adjacent poles. An angular distance between two adjacent poles may define a pole pitch parameter. The arc length on the circumferential rotor surface 150 between two adjacent poles of the rotor may be referred to as the pole pitch. The pole pitch may be measured circumferentially around the outer rotor surface 150 between adjacent center-pole axes 182. Each pole may have an associated surface area on the outer circumferential surface 150 of the rotor 120. Each pole may be represented by the arc length on the surface between adjacent inter-polar axes 180, 184.

An electromagnetic field or signal may be composed of a summation of harmonic components having different frequencies and magnitudes. Each harmonic component may be represented as a frequency and a magnitude. The signal may include a fundamental component. The fundamental component may be the frequency component having the greatest magnitude.

During operation, the stator and rotor fundamental component fluxes may align and rotate in the same direction at the same frequency. The interaction between the fundamental component of the stator flux and the rotor flux generates a torque. The stator and rotor harmonic fluxes may have different pole numbers, rotation speeds and directions. As a result, the interaction between the harmonic fluxes generates torque fluctuations, referred to as torque ripple. The torque ripple may have harmonic components having different frequencies. The order of a torque ripple component may be defined as the ratio of the frequency of the torque ripple component to the speed of the rotor in revolutions per second.

One effect of the torque ripple is that it may cause speed oscillations of the rotor. Further, the torque ripple may impact noise and vibration of the motor and components coupled to the electric machine. Higher order torque ripple frequencies may be filtered out by the limited bandwidth of the coupled mechanical system. Lower harmonic frequencies of the torque ripple may give rise to mechanical oscillations in the coupled system. It is desirable to reduce the torque ripple in order to reduce vibration and noise in systems that incorporate electric machines.

A typical outer circumferential surface 150 of the rotor 120 is rounded or smooth. In some applications, the outer surface 150 of the rotor laminations 138 may define a pattern of axial grooves. The grooves may be channels that are oriented parallel to the axis 170. The grooves may span an axial length of the outer surface 150 of the rotor 138. The effect of the grooves is to reduce the magnitude of a selected harmonic component of the torque while not affecting other harmonic components. In many vehicle applications, it may be desirable to reduce the magnitude of several harmonic components. The grooves may be of a rounded shape having a predetermined depth from the outer surface 150. In other configurations, the grooves may have alternate shapes such as rectangular or trapezoidal. The shape of the grooves may be configured to minimize a particular harmonic component.

Laminations that are bonded together that define the same pattern of grooves on the rotor surface 150 may be referred to as a section. In some rotor configurations, the rotor 120 may be constructed of a single section. A subset of one or more axial grooves may correspond to the poles of the rotor 120. In some configurations, the axial grooves associated with each pole may be the same pattern. For example, an axial groove may be located at a midpoint of each pole. As another example, axial grooves may be defined at a predetermined circumferential distance on either side of the midpoint of the pole. Each rotor lamination 138 may be configured to define the same groove pattern for each of the poles. The groove pattern defined for the poles may repeat as the outer circumferential surface 150 is followed around the axis 170.

Figure 4A:
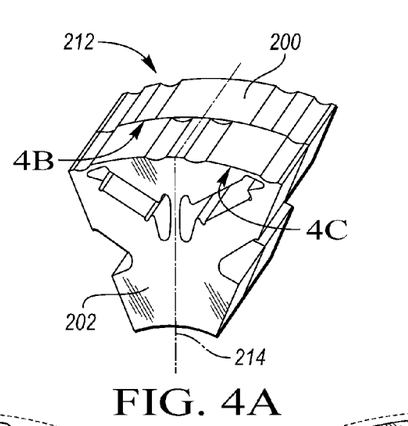
FIG. 4A is an example of a two-section rotor design.
Figure 4B:
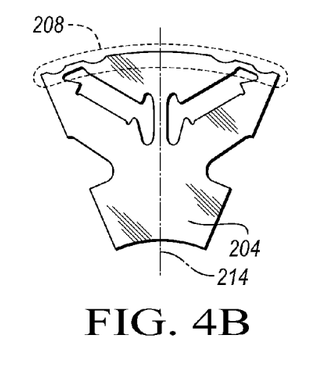
FIGS. 4B and 4C are side views of the rotor laminations for each section of FIG. 4A.
Figure 4C:
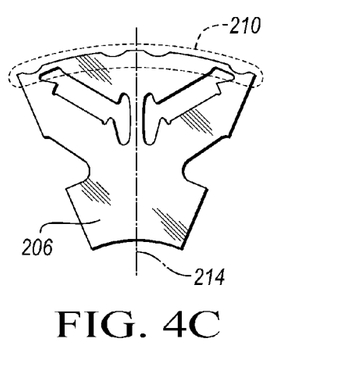

In some configurations, the rotor may be comprised of more than one section. FIG. 4A depicts one pole of a two-section rotor 212. In the two-section rotor 212, a first section 200 may be comprised of a plurality of first rotor laminations 204 having a first outer circumference groove pattern 208 as shown in FIG. 4B. A second section 202 may be comprised of a plurality of second rotor laminations 206 having a second outer circumference groove pattern 210 as shown in FIG. 4C. The first section 200 and the second section 202 may be bonded together to comprise the rotor 212 having two sections. The first outer circumference groove pattern 208 may define one or more grooves at a first set of predetermined locations on the outer circumferential surface of the first rotor lamination 204 relative to a midpoint 214 of each of the poles. The second outer circumference groove pattern 210 may define one or more grooves on the outer circumferential surface of the second rotor lamination 206 at a second set of predetermined locations relative to the midpoint 214 of each of the poles. The first and second set of predetermined locations may be different such that when the first section 200 and the second section 202 are bonded together that the grooves do not go across the entire axial length of the two-segment rotor 212.

In some configurations, the first groove pattern 208 may repeat for each of the poles. In some configurations, the first groove pattern 208 may repeat every two poles or three poles. In some configurations, the first groove pattern 208 may be different for each of the poles. Similar configurations are possible for the second groove pattern 210. In some configurations, a subset of the axial grooves may be defined across the entire axial length of the outer circumferential surface of the rotor 212. The first set of predetermined locations and the second set of predetermined locations may include a subset of axial grooves at a same location relative to the midpoint 214 of each pole.

An advantage of the multiple-section rotor configuration is that the magnitude of multiple harmonic components may be reduced. The groove pattern of each section may be configured to reduce a particular harmonic frequency component. For example, the first section 200 may be configured to reduce the magnitude of a first harmonic frequency component and the second section 202 may be configured to reduce the magnitude of a second harmonic frequency component. By combining segments with different patterns of grooves, torque ripple created by multiple harmonic frequencies may be reduced.

Figure 5:
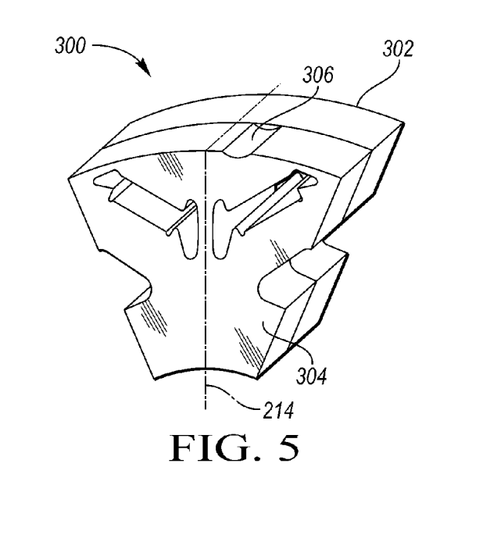
FIG. 5 is an example of a two-section rotor in which one section is smooth.

FIG. 5 depicts one pole of an alternative two-section rotor 300 configuration. A first section 302 may be comprised of rotor laminations having a smooth outer circumferential surface. That is, the first outer circumference groove pattern does not define any grooves on the surface of the first section 302. The second section 304 may be comprised of rotor laminations that define a single groove 306 per pole. In some configurations, the single groove may 306 be at the same position relative to the midpoint 214 of each of the poles. In some configurations, the position of the single groove 306 relative to the midpoint 214 of each of the poles may be different for two or more poles.

Figure 6:
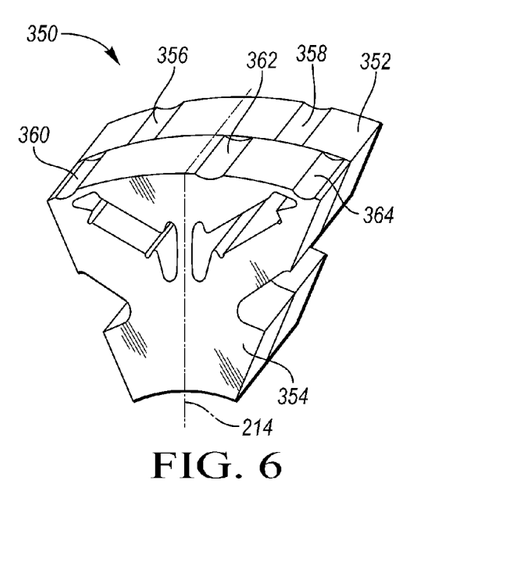
FIG. 6 is another example of a two-section rotor in which the sections have a different groove pattern.

FIG. 6 depicts one pole of an alternative two-section rotor configuration 350. The first section 352 may be comprised of rotor laminations that define two grooves 356, 358 per pole. The second section 354 may be comprised of rotor laminations that define three grooves 360, 362, 364 per pole. For each pole, the grooves may be located at the same position relative to the midpoint 214 of the pole. The first section 352 and the second section 354 may be configured such that no grooves traverse the entire axial length of the outer circumferential surface.

In some configurations, an axial length of each section of the rotor may be equal. In some configurations, the axial length of the sections may be different. The axial stack length may be varied by the number of laminations used for each section. The axial length of each section may impact the effectiveness at reducing a particular harmonic component. The axial length of each section may be tuned to achieve the desired harmonic component reduction.

Figure 7:
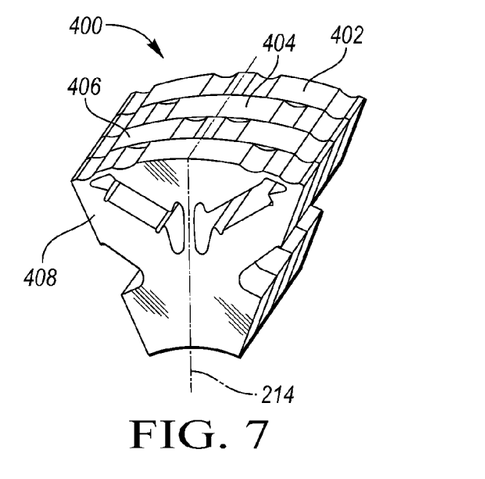
FIG. 7 is an example of a four-section rotor in which the groove pattern alternates between sections.

In some configurations, more than two sections may be utilized. FIG. 7 depicts a four-section rotor configuration 400. In this configuration, a first rotor lamination and a second rotor lamination may be defined. Sections may be formed from the first rotor lamination and the second rotor laminations and arranged such that the rotor has sections with alternating groove patterns. For example, the four-section rotor 400 may comprise a first section 402, a second section 404, a third section 406, and a fourth section 408. The first section 402 and the third section 406 may be comprised of the first rotor lamination. The second section 404 and the fourth rotor section 408 may be comprised of the second rotor lamination. This configuration defines a circumferential rotor surface in which the axial groove patterns alternate such that adjacent sections have a different groove pattern. In other configurations, four different rotor laminations may be defined such that each section has a different groove pattern.

In some configurations, the rotor laminations may define a subset of grooves that extends for the entire axial length of the rotor surface. In some configurations, the rotor laminations may define a subset of grooves that extend for more than one consecutive section but not across the entire axial length of the rotor. In some configurations, there may be no grooves that extend the entire axial length of the rotor surface.

Figure 8:
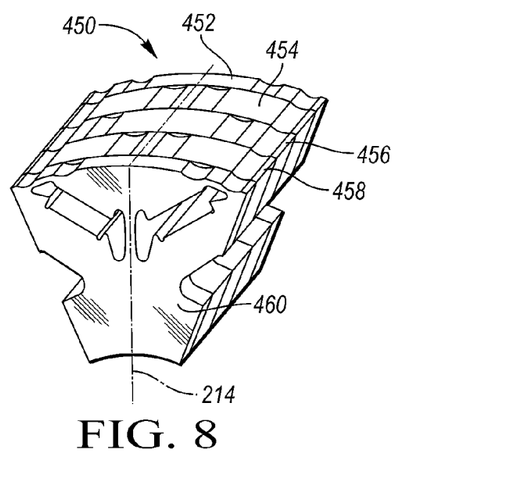
FIG. 8 is an example of a five-section rotor in which some sections have different axial length.

FIG. 8 depicts a five-section rotor configuration 450 that includes five sections in which the sections are not all of the same axial length. For example, the rotor 450 may comprise a first section 452, a second section 454, a third section 456, a fourth section 458, and a fifth section 460. In some configurations, the first section 452 and the fifth section 460 may be half the length of the sections between. The sections may be assembled such that the groove pattern for adjacent sections is different while the groove pattern for every second section is the same. The sections located at distal ends of the rotor axis may be of reduced axial length and may have the same groove pattern.

Another technique to adjust the torque ripple may be by skewing the rotor. A skewed rotor may be described as a rotor having at least two sections in which the magnet openings are offset from one another. The skewed rotor may be combined with the various groove patterns to further reduce torque ripple.

Figure 9A:
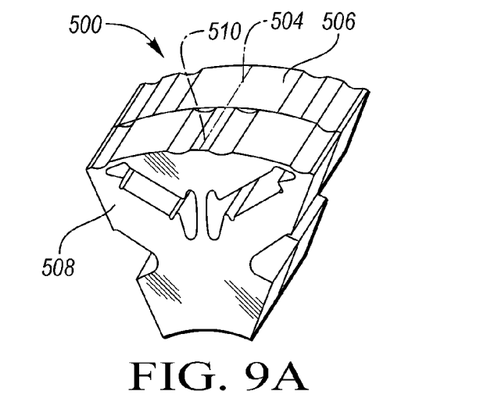
FIG. 9A is an example of a two-segment rotor before the sections are skewed.
Figure 9B:
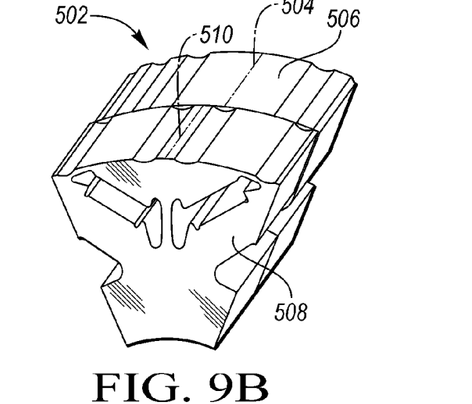
FIG. 9B is an example of a two-segment rotor in which the sections are skewed relative to one another.

FIG. 9A depicts a rotor 500 comprised of two sections that are not skewed relative to one another. The rotor 500 may be comprised of a first section 506 and a second section 508. The two sections are arranged such that a first section pole midpoint 504 is aligned with a second section pole midpoint 510. FIG. 9B depicts a skewed rotor configuration 502. In the skewed rotor configuration 502, the first section 506 is rotated relative to the second section 508 such that the first section pole midpoint 504 is at an angle relative to the second section pole midpoint 510. The skewing of the rotor sections may also apply to rotor configurations that include more than two sections. The rotor sections may be aligned such that the pole midpoints for each section are rotated relative to the others. The skewing described is relative to the pole midpoint but the skewing may be described relative to a different reference point on the sections. The pole locations as defined by each of the sections may be rotated or offset by a predetermined angle from one another.

Figure 10:
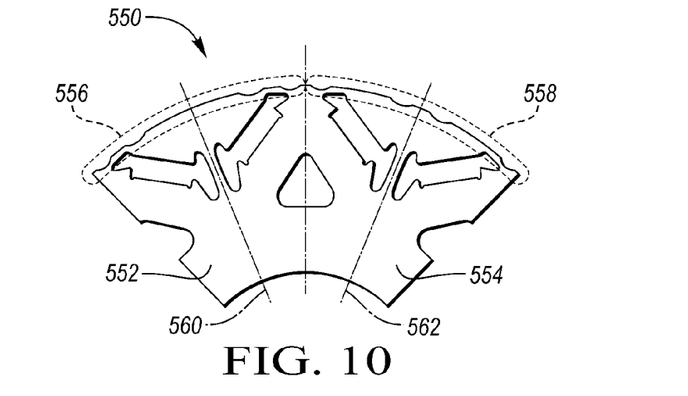
FIG. 10 is a side view of a lamination in which the pattern of grooves is different for adjacent poles of the rotor.

In some configurations, the rotor may be comprised of a single section. However, there may be at least two poles that have a different groove pattern. FIG. 10 depicts a single section rotor 550 comprised of laminations that define a different groove pattern for adjacent poles. For example, a first pole 552 may have a first associated groove pattern 556 and a second pole 554 may have a second associated groove pattern 558. The second groove pattern 558 may define grooves at different positions relative to a second pole midpoint 562 than the first groove pattern 556 defines relative to the first pole midpoint 560. In this configuration, the first groove pattern 556 and the second groove pattern 558 may repeat every other pole. That is, the groove pattern for the rotor may repeat on the circumferential surface at an arc length corresponding to two poles of the rotor.

The axial groove patterns may be defined such that adjacent poles have different groove patterns. The groove patterns may alternate between poles about the axis. In some configurations, the groove pattern may differ for three consecutive poles. That is, none of three consecutive poles may exhibit the same groove pattern. The groove pattern may repeat for each set of three poles. In some configurations, the axial groove pattern for the rotor may repeat on the circumferential surface at an arc length corresponding to one pole of the rotor.

Figure 11:
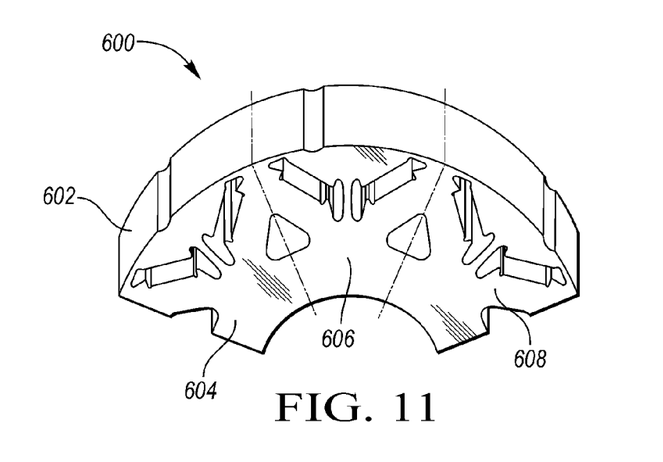
FIG. 11 is an example of a single-section rotor in which the pattern of grooves is different for three consecutive poles of the rotor.

FIG. 11 depicts a rotor 600 comprised of a single section. The single section 602 is comprised of rotor laminations that define a different axial groove pattern for three consecutive poles 604, 606, 608. The first pole 604 may be associated with a first groove pattern, the second pole 606 may be associated with a second groove pattern, and the third pole 608 may be associated with a third groove pattern. The pattern defined by the three poles 604, 606, 608 may repeat such that the groove pattern is repeated around the circumference of the rotor 600. In this configuration, the next pole (not shown) adjacent to the third pole 608 may have the same groove pattern as the first pole 604. The axial groove pattern for the rotor may repeat on the circumferential surface at an arc length corresponding to three poles of the rotor.

The configurations described herein may be combined. A rotor may be comprised of multiple sections that define a different surface groove pattern. Each section may define a different surface groove pattern for each of the poles. The groove pattern defined by the sections may repeat over a number of poles.

Figures 12, 13:
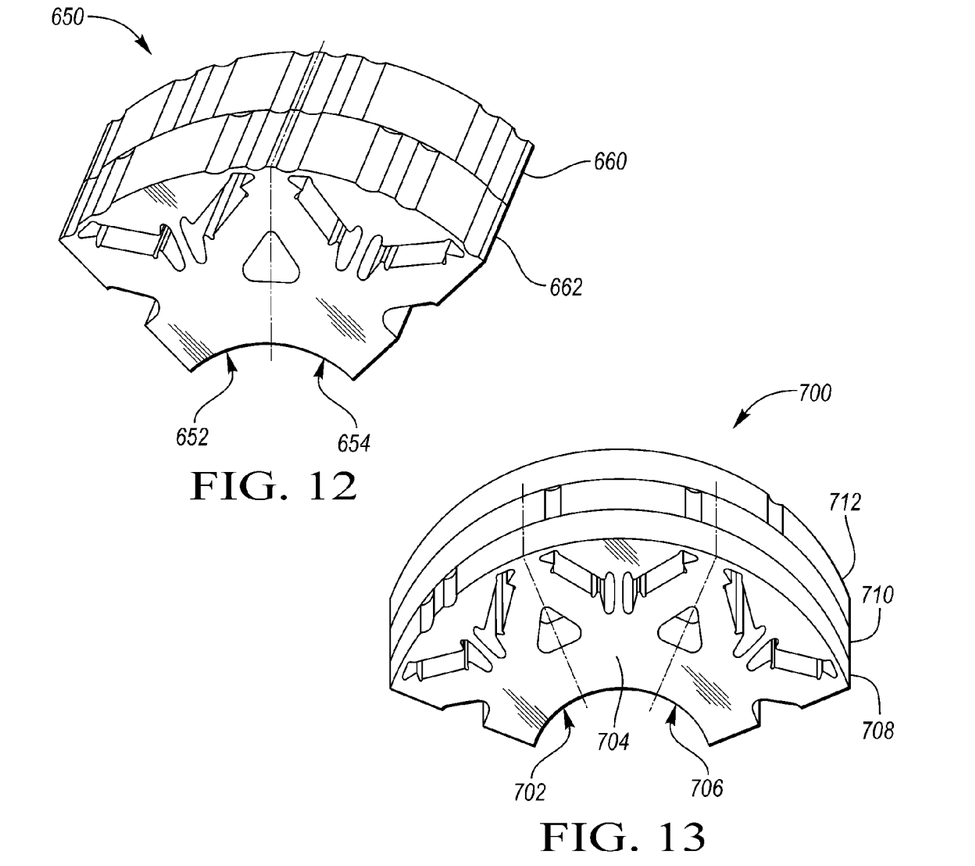
FIG. 12 is an example of a two-section rotor in which the pattern of grooves for each of the sections alternates between poles of the rotor.
FIG. 13 is an example of a three-section rotor in which each section defines a groove pattern every third pole of the rotor.

FIG. 12 depicts a two-section rotor configuration 650 in which each of the sections define a different groove pattern for adjacent poles. A first section 660 may include a first groove pattern for a first pole 652 and a second groove pattern for a second pole 654. A second section 662 may define a third groove pattern for the first pole 652 and a fourth groove pattern for the second pole 654. In some configurations, the same rotor lamination may be used for each of the sections. However, the rotor laminations may be shifted by one pole for each section so that each pole has a different groove pattern across the axial length of the rotor.

FIG. 13 depicts a three-section rotor 700 in which each section defines a groove pattern for every third pole. Depicted is a first pole 702, a second pole 704 and a third pole 706. Also depicted are a first section 708, a second section 710, and a third section 712. The first section 708 may be comprised of rotor laminations that define a first groove pattern for the first pole 702 while the surface is smooth for the second pole 704 and the third pole 706. The second section 710 may be comprised of rotor laminations that define a second groove pattern for the second pole 704 while the surface is smooth for the first pole 702 and the third pole 706. The third section 712 may be comprised of rotor laminations that define a third groove pattern for the third pole 706 while the surface is smooth for the second pole 704 and the third pole 706. The groove pattern for each of the sections may repeat every third pole.

Figure 14:
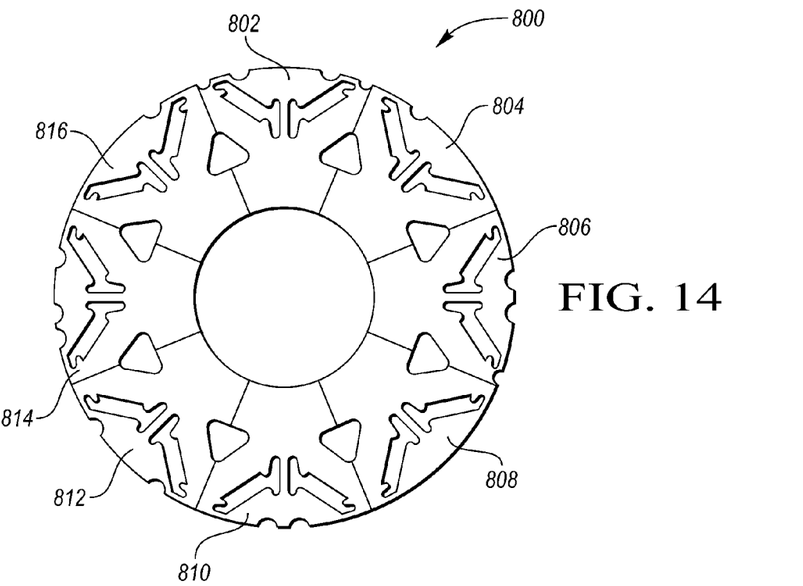
FIG. 14 is an example of a single-section rotor in which the pattern of grooves for each of the poles is different.

FIG. 14 depicts a single-section rotor lamination 800 for a rotor that may comprise a single section in which the groove pattern for each pole is different. Depicted is an eight-pole rotor in which each pole has a different axial groove pattern. The number of axial grooves defined for the rotor poles 802-816 may not be the same for each of the poles. For example, a first rotor pole 802, may define four axial grooves on the circumferential surface. A third rotor pole 806 and a seventh rotor pole 814 may define three axial grooves on the circumferential surface. A fifth rotor pole 810 and a sixth rotor pole 812 may define two axial grooves on the circumferential surface. A second rotor pole 804 and an eighth rotor pole 816 may define one axial groove on the circumferential surface. A fourth rotor pole 808 may define a smooth circumferential surface without any axial grooves. The axial groove pattern may be different based on the number of axial grooves defined and the arrangement of the axial grooves relative to the midpoint of the pole.

Figure 15:
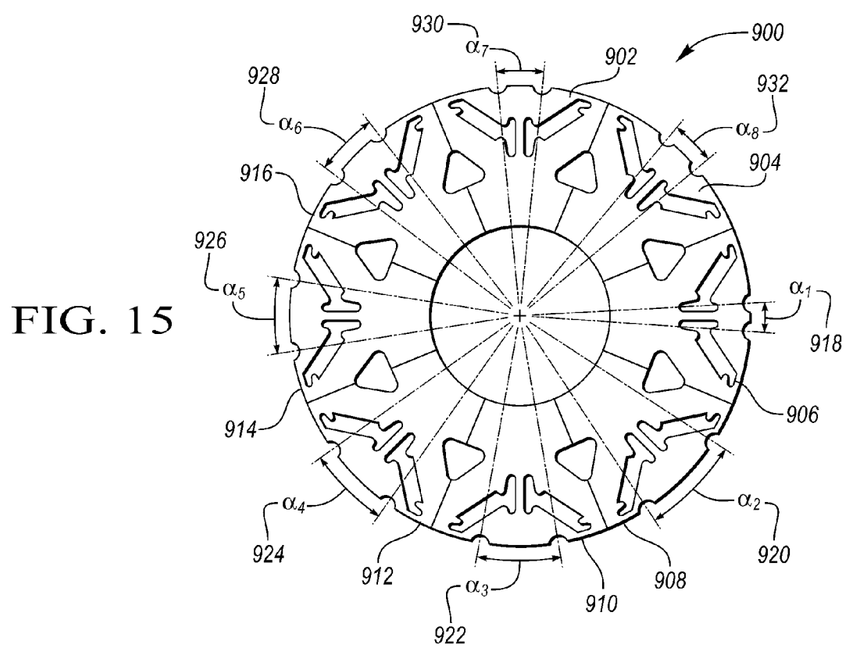
FIG. 15 is an example of a single-section rotor in which each of the poles includes two axial grooves located at a different angle.

In some configurations, each pole of the rotor may include the same number of axial grooves. FIG. 15 depicts a single section rotor lamination 900 in which each of the poles defines two axial grooves. The pattern of the two axial grooves for each of the poles may be defined by an angle between each of the axial grooves. In some configurations, the axial grooves may be equidistant from the midpoint of the pole. For example, a first rotor pole 906 may define axial grooves that are separated by an angle $\alpha_1$ 918. A second rotor pole 908 may define axial grooves that are separated by an angle $\alpha_2$ 920. A third rotor pole 910 may define axial grooves that are separated by an angle $\alpha_3$ 922. A fourth rotor pole 912 may define axial grooves that are separated by an angle $\alpha_4$ 924. A fifth rotor pole 914 may define axial grooves that are separated by an angle $\alpha_5$ 926. A sixth rotor pole 916 may define axial grooves that are separated by an angle $\alpha_6$ 928. A seventh rotor pole 902 may define axial grooves that are separated by an angle $\alpha_7$ 930. An eighth rotor pole 904 may define axial grooves that are separated by an angle $\alpha_8$ 932. In some configurations, the angles 918-932 may be different for each of the poles. In some configurations, the angles 918-932 may alternate values.

In some configurations, the rotor may comprise multiple sections with an alternative groove pattern over a predetermined number of poles. For example, the first section may define a first groove pattern that repeats every second pole. The second section may define a second groove pattern that repeats every second pole. The groove pattern for the first and second sections may be different for each pole.

The placement of the axial grooves within each pole and the number of sections may be determined to reduce selected harmonics. The figures herein depict the axial grooves but it is expected that the number of grooves and positioning of the axial grooves may be varied based on a particular motor design. The number of sections that are used may also vary based on the particular motor design.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A permanent magnet machine comprising:
   a rotor comprising a plurality of poles arranged about an axis, each of the poles corresponding to a predetermined arc length of a circumferential surface of the rotor formed by a plurality of axially stacked laminations that define a plurality of axial grooves on the circumferential surface of the rotor for each of the poles such that a spacing between the grooves is different for each of the poles.

2. The permanent magnet machine of claim 1 wherein the plurality of axial grooves for each of the poles is two axial grooves.

3. The permanent magnet machine of claim 2 wherein the plurality of axial grooves for each of the poles is defined by an angle between the axial grooves of each of the poles and the angle is different for each of the poles.

* * * * *